United States Patent
Ohtaki et al.

(10) Patent No.: US 7,295,430 B2
(45) Date of Patent: Nov. 13, 2007

(54) PORTABLE DEVICE HAVING HIGH STRENGTH

(75) Inventors: Kiyokazu Ohtaki, Niwa-gun (JP); Seiji Ishigaki, Niwa-gun (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 168 days.

(21) Appl. No.: 10/762,805

(22) Filed: Jan. 22, 2004

(65) Prior Publication Data

US 2004/0149605 A1    Aug. 5, 2004

(30) Foreign Application Priority Data

Feb. 4, 2003    (JP) ............................. 2003-026920

(51) Int. Cl.
 *G06F 1/16* (2006.01)
(52) U.S. Cl. .................... 361/683; 361/684; 206/37.1; 206/305; 206/587
(58) Field of Classification Search ................ 361/683, 361/684; 206/37.1, 305, 587; 248/636, 248/694

See application file for complete search history.

(56) References Cited

U.S. PATENT DOCUMENTS

| | | | | |
|---|---|---|---|---|
| 4,275,810 A | * | 6/1981 | Waldmeier | 206/459.5 |
| 4,364,472 A | * | 12/1982 | Waldmeier | 206/459.5 |
| 5,133,451 A | * | 7/1992 | Boyd et al. | |
| 5,220,319 A | * | 6/1993 | Kendel | 340/825.69 |
| 5,260,532 A | | 11/1993 | Tinder et al. | 200/302.1 |
| 5,388,691 A | * | 2/1995 | White | 206/305 |
| 5,477,421 A | * | 12/1995 | Bethurum | 361/818 |
| 5,529,503 A | * | 6/1996 | Kerklaan | 439/76.1 |
| D378,634 S | * | 4/1997 | LaPere | D3/273 |
| 5,768,925 A | | 6/1998 | Ozawa et al. | 70/408 |
| 6,041,924 A | * | 3/2000 | Tajima | 206/320 |
| 6,181,564 B1 | * | 1/2001 | Furusho | 361/737 |
| 6,504,710 B2 | * | 1/2003 | Sutton et al. | 361/686 |
| D476,987 S | * | 7/2003 | Takiguchi | D14/341 |
| 6,588,871 B2 | * | 7/2003 | Studholme et al. | 347/19 |
| 6,632,097 B2 | * | 10/2003 | Chang | 439/76.1 |
| D486,148 S | * | 2/2004 | Chan | D14/341 |
| 6,765,311 B1 | * | 7/2004 | Labonde | 307/10.1 |
| 6,788,270 B2 | * | 9/2004 | Suprunov et al. | 343/866 |
| 6,861,171 B1 | * | 3/2005 | Suzuki | 429/34 |
| 2002/0164993 A1 | * | 11/2002 | Elliot | 455/456 |

FOREIGN PATENT DOCUMENTS

| | | |
|---|---|---|
| DE | 19849397 | 5/2000 |
| JP | 2002-339605 | 11/2002 |

OTHER PUBLICATIONS

European Search Report, dated Sep. 23, 2004, issued by the European Patent Office in corresponding EPO Application No. EP 04 00 1960.

* cited by examiner

*Primary Examiner*—Jayprakash Gandhi
*Assistant Examiner*—Anthony Q Edwards
(74) *Attorney, Agent, or Firm*—Synnestvedt & Lechner LLP

(57) ABSTRACT

A thin portable device having high strength. The portable device includes a portable device body for accommodating an electronic component used for communication. The portable device body includes an upper case and a lower case, each having a cavity. A holding frame holds peripheral portions of the upper case and the lower case so that the upper case and the lower case are connected to each other with the cavities opposed to each other.

10 Claims, 5 Drawing Sheets

PORTABLE DEVICE HAVING HIGH STRENGTH

BACKGROUND OF THE INVENTION

The present invention relates to a portable device used for remote control.

Due to the progress in information communication technology and the widespread use of communication devices, remote control has become popular. Remote control enables a user to remotely control an external device of a vehicle, a house, an electrical appliance, or the like with a portable device so that the external device performs a predetermined action. The portable device transmits a signal, which includes a code corresponding to the operation the user has performed, in a predetermined range. When receiving a signal from the portable device, the external device decodes the code included in the signal to execute a command that is associated with the code. For example, in a keyless entry system, a user approaches a vehicle and pushes an unlock button of the portable device to unlock the vehicle doors. In a smart entry system, the doors are automatically unlocked when a user who is carrying a portable device approaches the vehicle and are automatically locked when the user moves away from the vehicle.

FIG. 1 shows a portable device 80, which remotely controls a vehicle and which is described in Japanese Laid-Open Patent Publication No. 2002-339605. The portable device 80 includes a card-like case 81 accommodating a battery 82 and a circuit board 84 to which a plurality of electronic components are connected. It is desired that such a portable device 80 be made more thin and compact to further improve portability.

The strength of the case 81 of the portable device 80 decreases when the case 81 is thin and made of a synthetic resin. Accordingly, the application of external force may damage the portable device 80. To ensure the strength of the case 81, the case 81 may be made of metal. However, the metal case 81 would block radio waves and lower the signal receiving and transmitting capability of the portable device 80.

SUMMARY OF THE INVENTION

It is an object of the present invention to provide a thin portable device having high strength.

To achieve the above object, the present invention provides a portable device for receiving an electronic component used for communication. The portable device includes a portable device body for accommodating the electronic component. The portable device body includes an upper case and a lower case, each having a cavity. A holding member holds peripheral portions of the upper case and the lower case so that the upper case and the lower case are connected to each other with the cavities opposed to each other.

A further aspect of the present invention is a portable device for receiving an electronic component used for communication. The portable device includes a portable device body made of a synthetic rein for accommodating the electronic component. The portable device body includes an upper case and a lower case, each having a cavity. A holding member detachably holds peripheral portions of the upper case and the lower case so that the upper case and the lower case are connected to each other with the cavities opposed to each other. The holding member is made of metal that is more rigid than the portable device body and includes a plurality of holding member pieces. Adjacent ones of the holding member pieces are in contact with each other at a location separated from the center of a side of the portable device.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A portable device 2 according to a preferred embodiment of the present invention will now be discussed with reference to FIGS. 2 to 5.

Figure 5:
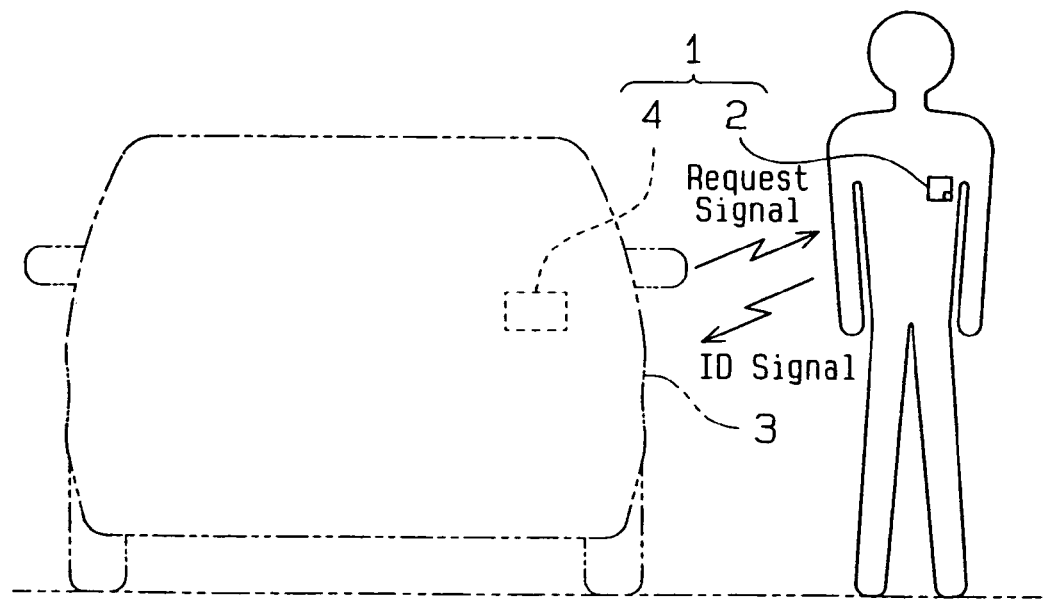
FIG. 5 is a schematic diagram showing a smart entry system using the portable device of FIG. 2.

Referring to FIG. 5, a smart entry system 1 includes a portable device 2, which is carried by a user, and a lock device 4, which is installed in the vehicle 3. In the smart entry system 1, the lock device 4 transmits a request signal. When the user, who is carrying the portable device 2, enters a predetermined region near the vehicle 3, the portable device 2 receives the request signal of the lock device 4. The request signal requests the portable device 2 for transmission of an ID code. In response to the request signal, the portable device 2 transmits an ID signal, which includes an ID code stored in the portable device 2. When receiving the ID signal from the portable device 2, the lock device 4 compares the ID code included in the ID signal with an ID code stored in the lock device 4. When the two ID codes match, the lock device unlocks the doors. Conversely, if the user, who is holding the portable device 2 moves away from the vehicle 3, the lock device 4 locks the doors when the ID signal is no longer received from the portable device 2.

Figure 1:
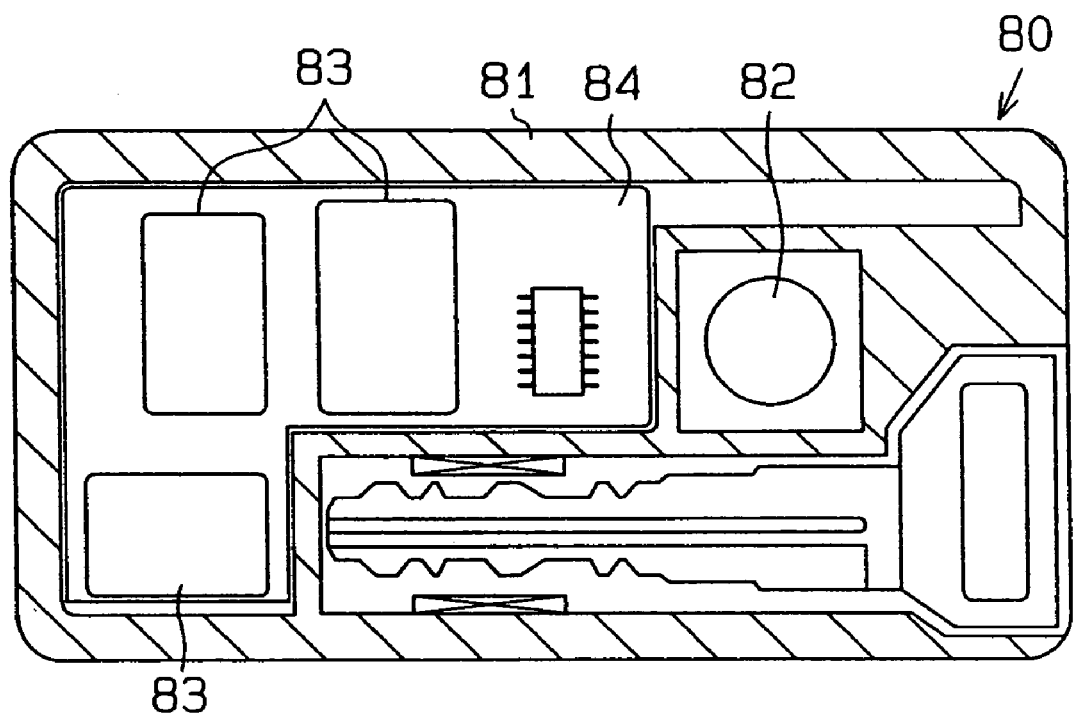
FIG. 1 is a schematic diagram showing a prior art portable device.
Figure 2:
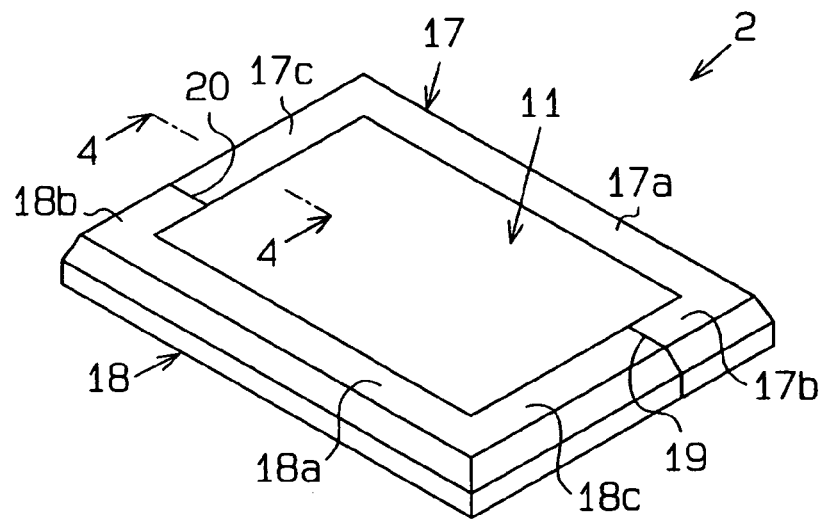
FIG. 2 is a perspective view showing a portable device according to a preferred embodiment of the present invention.
Figure 3:
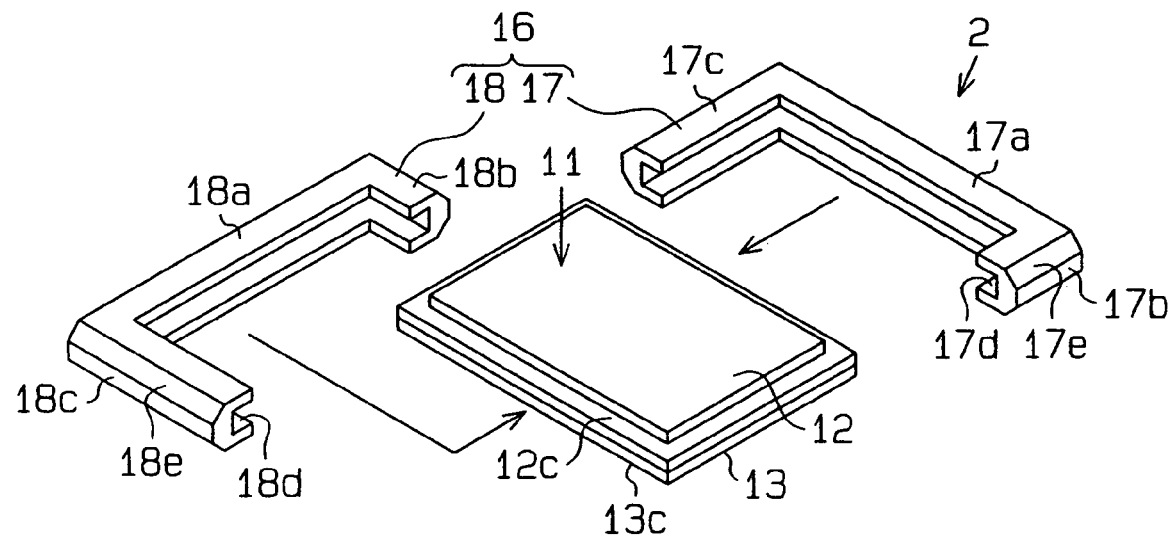
FIG. 3 is an exploded perspective view showing the portable device of FIG. 2.
Figure 4:
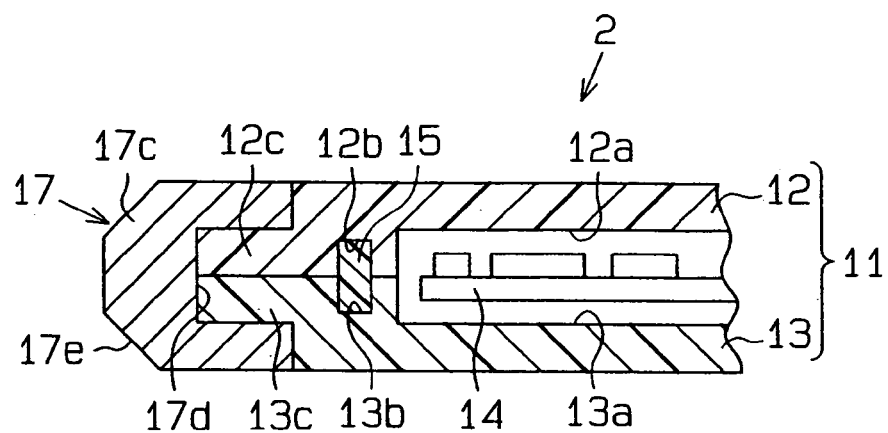
FIG. 4 is a cross-sectional view taken along line 4-4 in FIG. 2.

Referring to FIGS. 2 to 4, the portable device 2 includes a portable device body 11 for accommodating a circuit board 14 to which electronic components used for communication, such as ICs, are connected. The portable device body 11 includes an upper case 12, which is made of a synthetic resin, and a lower case 13, which is made of a synthetic resin. The upper case 12 includes a first cavity 12a. The lower case 13 has a second cavity 13a, which corresponds to the first cavity 12a. The upper case 12 and the lower case 13 are connected to each other with the first and second cavities 12a and 13a opposed to each other. Grooves 12b and 13b respectively extend along the peripheral portions of the opposing surfaces connecting the upper and lower cases 12 and 13. The grooves 12b and 13b define a rectangular seat for receiving a packing 15 (seal), which is made of an elastic synthetic resin. Thus, the packing 15 is held in the boundary between the upper case 12 and the lower case 13. The packing 15 makes the portable device body 11 water resistant and prevents water from entering the portable device body 11.

Flanges 12c and 13c extend from and throughout the rims of the upper case 12 and the lower case 13, respectively. A holding frame 16 is detachably attached to flanges 12c and 13c in a manner encompassing the portable device body 11. The holding frame 16 is made of a metal material that is more rigid than the synthetic resin of the portable device body 11. In the preferred embodiment, the holding frame 16 is made of aluminum. The holding frame 16 may also be made of other metals, such as steel or magnesium.

The holding frame 16 includes a first frame piece 17 and a second frame piece 18, which have U-shaped cross-sections. The first frame piece 17 includes a linear base 17a. A short extension 17b and a long extension 17c having different lengths extend integrally from the ends of the base 17a parallel to each other. In the same manner, the second frame piece 18 includes a linear base 18a. A short extension 18b and a long extension 18c having different lengths extend integrally from the ends of the base 18a parallel to each other. The first frame piece 17 and the second frame piece 18 are substantially identical to each other. Engaging grooves 17d and 18d extend along the inner surfaces of the first frame piece 17 and the second frame piece 18, respectively. The engaging grooves 17d and 18d are engaged with the flanges 12c and 13c of the cases 12 and 13 through a concavo-convex relationship to hold the upper case 12 and the lower case 13 in a state connected to each other. Beveled surfaces 17e and 18e are respectively formed on the edges of the frame pieces 17 and 18.

When the holding frame 16 is attached to the portable device body 11, the base 17a of the first frame piece 17 and the base 18a of the second frame piece 18 are arranged on opposite sides of the cases 12 and 13. In this state, the end surfaces of the short extension 17b and the long extension 18c are connected to each other. Further, the end surfaces of the short extension 18b and the long extension 17c are connected to each other. Contact portions 19 and 20 of the first and second frame pieces 17 and 18 are separated from the center of the corresponding short sides of the portable device body 11.

When the portable device 2 is assembled, the engaging groove 17d of the first frame piece 17 and the engaging groove 18d of the second frame piece 18 are engaged with the flanges 12c and 13c from directions intersecting a line perpendicular to the plane of the portable device 2. Then, the first frame piece 17 and the second frame piece 18 are moved toward each other (in the directions indicated by the arrows in FIG. 2) to attach the holding frame 16 around the portable device body 11. This holds the upper case 12 and the lower case 13 with the holding frame 16.

When, for example, changing the battery, the first frame piece 17 and the second frame piece 18 are separated from each other in directions opposite to the arrows of FIG. 3. This removes the holding frame 16 from the portable device 2 and enables separation of the upper case 12 and the lower case 13. The battery, which is accommodated in the portable device body 11, is changed in this state.

The portable device 2 has the advantages described below.

(1) The rigid metal holding frame 16 holds the upper case 12 and the lower case 13, which form the portable device body 11. This reinforces the peripheral portion of the portable device 2. Thus, the portable device body 11 resists bending. Accordingly, the strength of the thin portable device 2 is ensured.

(2) The metal holding frame 16 is moved along the flanges 12c and 13c of the portable device body 11 for attachment to and removal from the portable device 2. Thus, screws or the like are not necessary to attach the holding frame 16 to the portable device 2. In addition, this structure enables the user to easily change the battery.

(3) The metal holding frame 16 covers only the flanges 12c and 13c, which extending along the peripheral portion of the upper case 12 and the lower case 13. Thus, the central portion of the upper case 12 and the lower case 13 are not covered. As a result, radio waves reach the communication electronic components arranged in the central portion of the portable device 2 without any interference. Accordingly, the strength of the portable device 2 is improved without lowering the communication capability of the portable device 2.

(4) The flange 12c of the upper case 12 and the flange 13c of the lower case 13 are engaged with the engaging grooves 17d and 18d of the holding frame 16 through a convexo-concave relationship. Accordingly, the holding frame 16 is easily attached to the portable device body 11.

(5) When the holding frame 16 is attached to the portable device body 11, the contact portions 19 and 20 of the first frame piece 17 and the second frame piece 18 are located at positions separated from the center of the short sides of the portable device body 11. This prevents stress from concentrating at a certain location when an external force bends the portable device body 11. Thus, the portable device 2 resists damage.

(6) The packing 15 is held between peripheral portions of the upper case 12 and the lower case 13. This improves the water resistance of the portable device 2.

(7) The holding frame 16 has beveled surfaces 17e and 18e. This makes the portable device 2 appear thinner than it actually is and improves the appearance of the portable device 2.

(8) The first frame piece 17 and the second frame piece 18 are made from the same material and have the same shape. This decreases the number of different types of components and saves manufacturing costs for the portable device 2.

It should be apparent to those skilled in the art that the present invention may be embodied in many other specific forms without departing from the spirit or scope of the invention. Particularly, it should be understood that the present invention may be embodied in the following forms.

Figure 6:
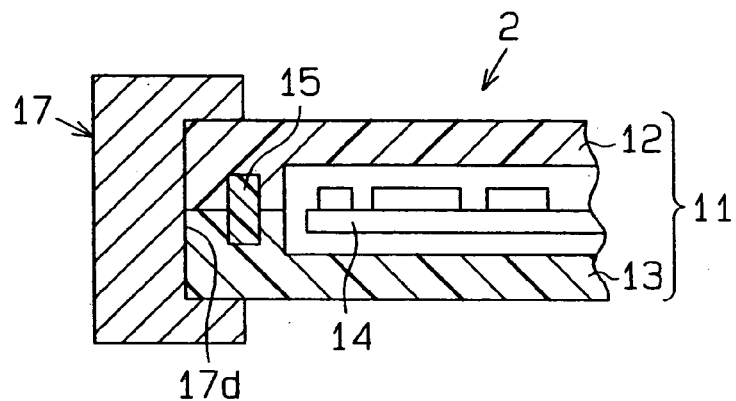
FIG. 6 is a cross-sectional view showing a portable device according to a further embodiment of the present invention.

The upper case 12 and the lower case 13 do not have to have the flanges 12c and 13c. For example, with reference to FIG. 6, the first frame piece 17 and the second frame piece 18 (not shown) may respectively have engaging grooves 17d and 18d (not shown) that engage the peripheral portions of the portable device body 11. In this structure, the surface of the holding frame 16 protrudes from the surface of the portable device body 11. This facilitates the removal of the holding frame 16 from the portable device body 11.

In the preferred embodiment, the holding frame 16 is made from a metal material, such as steel, magnesium, or aluminum. However, the holding frame 16 may be made of other materials such as a synthetic resin material having rigidity that is greater than that of the portable device body 11.

In the preferred embodiment, the packing 15 is held between the upper case 12 and the lower case 13. However, the portable device 2 does not have to have the packing 15.

Figure 7:
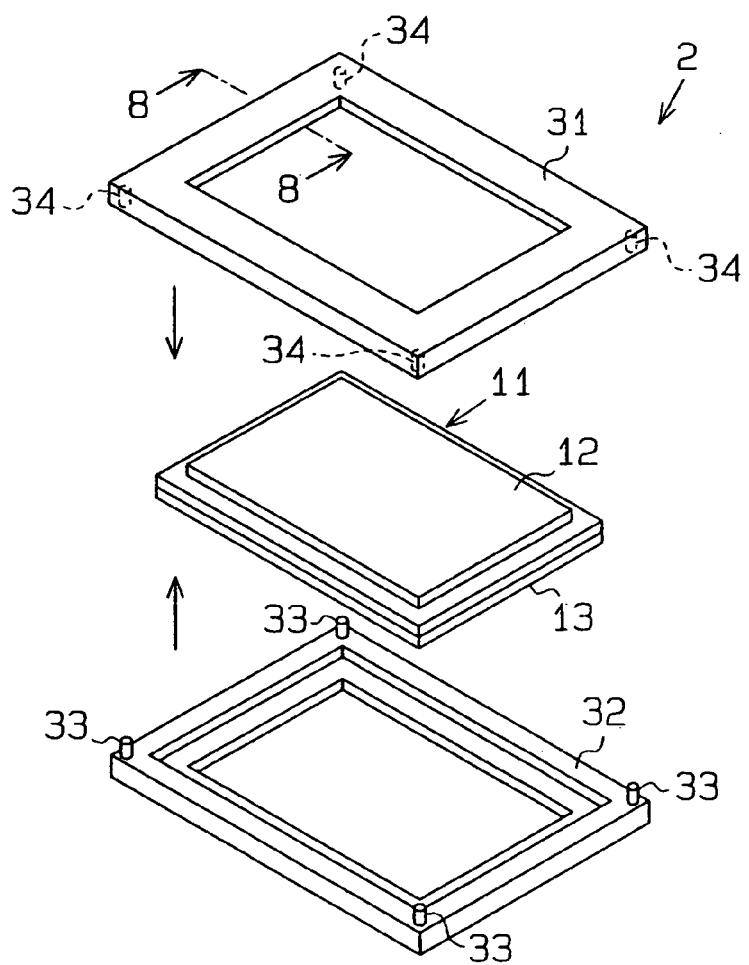
FIG. 7 is a perspective view showing a portable device according to a further embodiment of the present invention.
Figure 8:
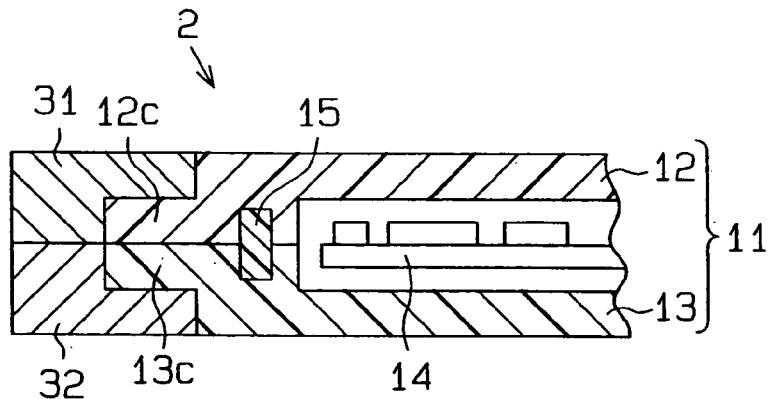
FIG. 8 is a cross-sectional view taken along line 8-8 in FIG. 7.

With reference to FIGS. 7 and 8, instead of the first frame piece 17 and the second frame piece 18, the holding frame 16 may include a first frame piece 31 and a second frame piece 32, which are rectangular. In such a structure, the first frame piece 31 and the second frame piece 32 hold the portable device body 11 from the directions indicated by the arrows in FIG. 7 (i.e., the directions toward the front and rear surfaces of the portable device 2). Pins 33 extend from each of the four corners of one of the frame pieces 31 and 32, and holes 34 are formed in each of the four corners of the other one of the frame pieces 31 and 32. The pins 33 are engaged with the associated holes 34 to connect the frame piece 31 to the frame piece 32.

Figure 9A:
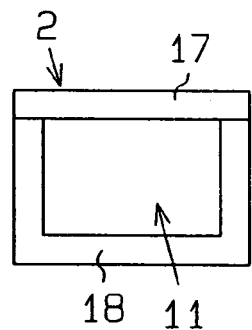
FIGS. 9A to 9E are front views showing portable devices according to further embodiments of the present invention.
Figure 9B:
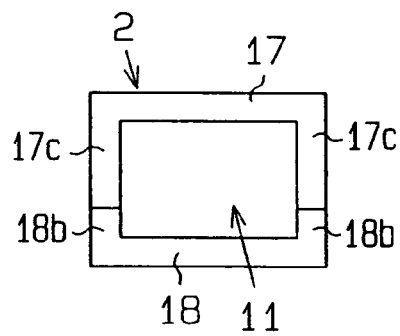

The first frame piece 17 and the second frame piece 18 do not have to be identical. For example, the holding frame 16 may include a linear first frame piece 17 and a U-shaped second frame piece 18, as shown in FIG. 9A. Alternatively, the holding frame 16 may include a first frame piece 17 having two long extensions 17c of the same length and a second frame piece 18 having two short extensions 18b of the same length, as shown in FIG. 9B.

Figure 9C:
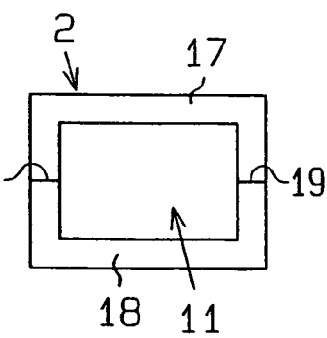
Figure 9D:
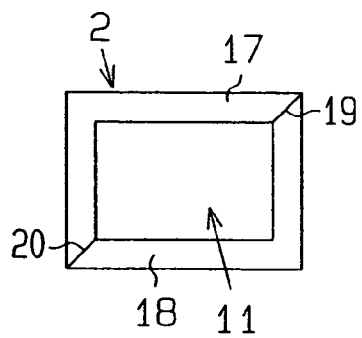
Figure 9E:
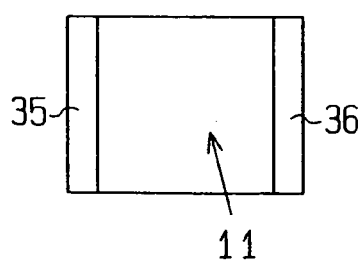

Referring to FIG. 9C, the first frame piece 17 and the second frame piece 18 may be formed so that the contact portions 19 and 20 are located at the center of the short sides of the portable device body 11. Alternatively, referring to FIG. 9D, the holding frame 16 may include an L-shaped first frame piece 17 and a second frame piece 18, which is identical to the first frame piece 17. In this structure, the contact portions 19 and 20 of the frame pieces 17 and 18 are located along a diagonal line of the portable device body 11. As another option, referring to FIG. 9E, the two cases 12 and 13 may be held between first and second frame pieces 35 and 36 located on opposite sides of the portable device body 11.

In the preferred embodiment, the holding frame 16 is formed from two parts, the first frame piece 17 and the second frame piece 18. However, the holding frame 16 may be formed from three or more parts so that the three or more parts hold the portable device 2 around the portable device body 11.

The present examples and embodiments are to be considered as illustrative and not restrictive, and the invention is not to be limited to the details given herein, but may be modified within the scope and equivalence of the appended claims.

What is claimed is:

1. A portable device comprising:
   an electronic component which receives and transmits wireless signals and powered by a battery;
   a portable device body for accommodating and enclosing the electronic component and the battery therein, the portable device body including an upper case and a lower case, each having a cavity and being made of a non-metal material which permits receipt and transmission of wireless signals therethrough for communication with the electronic component enclosed in the portable device body without significantly reducing the receiving and transmission capability of the electronic component; and
   a holding member detachably attached to the portable device body for holding peripheral portions of the upper case and the lower case so that the upper case and the lower case are connected to each other with the cavities opposed to each other, the upper case includes a first flange extending along the peripheral portion of the upper case; the lower case includes a second flange extending along the peripheral portion of the tower case; and the holding member has an inner surface including an engaging groove engaged with the first and second flanges when the upper case and the lower case are connected to each other, wherein the holding member is detachable from the portable device body for changing the battery.

2. The portable device according to claim 1, wherein the holding member holds the upper case and the lower case so as to surround the portable device body.

3. The portable device according to claim 1, further comprising a seal arranged between the upper case and the lower case.

4. The portable device according to claim 1, wherein the portable device body is made of a synthetic resin, and the holding member is made of a metal that is more rigid than the portable device body.

5. The portable device according to claim 1, wherein the holding member is made of metal and covers only the peripheral portions of the upper case and the lower case when the upper case and lower case are connected to each other.

6. The portable device according to claim 1, wherein the holding member includes a plurality of holding member pieces, wherein adjacent ones of the holding member pieces are in contact with each other at a location separated from the center of a side of the portable device.

7. The portable device according to claim 1, wherein the holding member includes two holding member pieces that are made of the same material and have the same shape, with the two holding member pieces holding the peripheral portions of the upper case and the lower case.

8. The portable device according to claim 1, wherein the holding member includes two holding member pieces attached to the portable device in directions intersecting a line perpendicular to the plane of the portable device.

9. The portable device according to claim 1, wherein the holding member includes two rectangular frame-like pieces attached to the portable device body in directions that are perpendicular to the plane of the portable device.

10. A portable device comprising:
    an electronic component which receives and transmits wireless signals and powered by a battery;
    a portable device body made of a synthetic resin accommodating the electronic component and the battery therein in which the portable device body permits receipt and transmission of wireless signals therethrough for communication with the electronic component enclosed in the portable device body without significantly reducing the receiving and transmission capability of the electronic component, wherein the portable device body includes an upper case and a lower case, each having a cavity; and
    a holding member detachably attached to the portable device body for detachably holding peripheral portions of the upper case and the lower case so that the upper case and the lower case are connected to each other with the cavities opposed to each other the upper case includes a first flange extending alone the peripheral portion of the upper case; the lower case includes a second flange extending along the peripheral portion of the lower case; and the holding member has an inner surface including an engaging groove engaged with the first and second flanges when the upper case and the lower case are connected to each other, the holding member being made of metal that is more rigid than the portable device body and including a plurality of holding member pieces, wherein adjacent ones of the holding member pieces are in contact with each other at a location separated from the center of a side of the portable device, wherein the holding member is detachable from the portable device body for changing the battery.

* * * * *